July 27, 1926.
A. T. KASLEY
1,593,768
TORPEDO POWER PLANT
Filed June 23, 1921
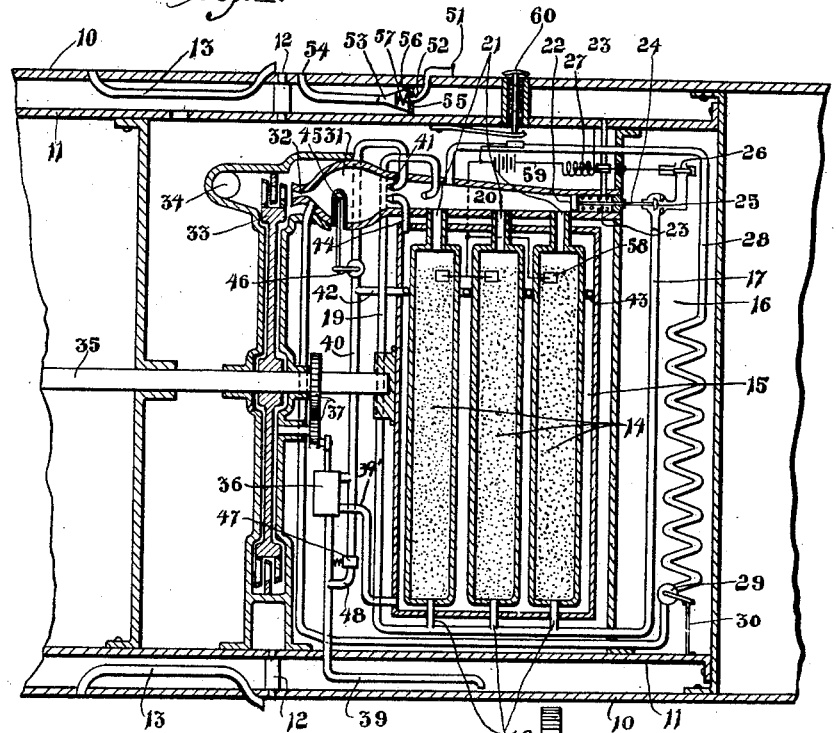
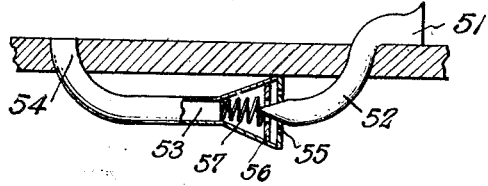
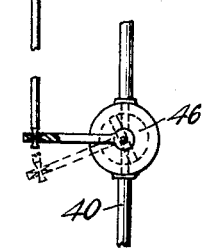
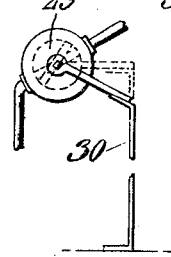
A. T. Kasley
INVENTOR
D. C. Davis
BY ATTORNEY Patented July 27, 1926.

1,593,768

UNITED STATES PATENT OFFICE.

ALEXANDER T. KASLEY, OF ESSINGTON, PENNSYLVANIA, ASSIGNOR, BY MESNE ASSIGNMENTS, TO THE GOVERNMENT OF THE UNITED STATES AS REPRESENTED BY THE SECRETARY OF THE NAVY.

TORPEDO POWER PLANT.

Application filed June 23, 1921. Serial No. 479,708.

This invention relates to power plants and more particularly to self-contained power plants adapted for use in the propulsion of automobile torpedoes, submarines and other self-propelled devices.

The invention has for an object the provision of a novel method and means for developing compound motive fluids, by which largely increased volumes of high-pressure motive fluid shall be generated and supplied for power purposes without increasing the weight or size of the self-propelled device, as at present constructed, to which such power plants are applied as, for example, automobile torpedoes, to the end that the propelling means thereof may be driven for a longer time and the self-propelled device propelled to a greater distance and at an increased speed.

A further object of my invention is to provide a method and means by which the products of combustion, given off by a mixture containing a solid combustible and a solid supporter of combustion so proportioned as to be in itself not capable of sustaining combustion, and, in addition, a regulated quantity of a fluid controller of combustion supplied to the mixture containing a solid combustible and a solid supporter of combustion, may be generated, controlled and utilized for supplying a high-pressure fluid to a motor.

The invention has also for an object the provision of a method and means for condensing compound vapors exhausted from the motor and for re-evaporating a portion of the condensed vapors, either by subjecting the condensate to the heat of the high-pressure products of combustion or to the heat surrounding the combustion chamber, or both, and mixing the re-evaporated condensate with the high pressure products of combustion for the purpose of increasing the volume and reducing the temperature of the compound motive fluid.

These and other objects of my invention, which will be made more manifest in the further description thereof, may be attained by the employment of the apparatus hereinafter described and illustrated in the accompanying drawing in which the Figure 1 is a diagrammatic sectional view of an embodiment of my improved power plant shown as applied to an automobile torpedo.

Figure 2 is a detail sectional view of the pump and associated by-passes.

Figures 3 and 4 are enlarged detail diagrammatic views of two of the valves and their thermostatic controls.

Figure 5 is an enlarged detail diagrammatic view of the injector for carrying off the non-condensed exhaust gases.

In carrying out the invention when applied to an automobile torpedo, I arrange in the central compartment of the torpedo one or more closed chambers charged with a mixture containing a solid combustible and a solid supporter of combustion in such proportions as to be in itself incapable of sustaining combustion. It is also desirable, under some circumstances, to mix with these solids a relatively inert solid for retarding the rapidity of the combustion process. The mixture is packed into the chambers, preferably in a porous condition, and combustion of the mixture is effected and controlled by supplying to the chamber a regulated quantity of a reacting fluid, preferably gaseous, hereinafter termed for distinction the fluid controller of combustion. The constituents of the solid mixture and the fluid controller of combustion therefor may be chosen from a wide range of substances. I have found that the following substances in substantially the proportions here given produce very satisfactory results: (1) potassium chlorate, 128 parts; hydrated magnesium sulphate 20 parts; magnesium 2 parts; the combustion of this mixture to be effected and controlled by regulated quantities of hydrogen sulphide; (2) ammonium nitrate, 80 parts; magnesium nitrate 50 parts; carbon, 10 parts, the combustion of the above mixture being effected and controlled by regulated quantities of oxygen. The first of the above mixtures I have found to be preferable since the chemical combination produces products of combustion which are almost completely condensable.

The fluid controller of combustion, in case the first mentioned mixture and hydrogen sulphide are used, may be stored in liquid form in a relatively small receptacle, preferably adjacent to the solid mixture containing chamber. The amount of fluid controller of combustion admitted to the mixture should be regulated so as to produce a substantially uniform pressure of the combustion products, which result may be accomplished by any well known pressure regulating mechanism, or by regulating the temperature of the liquid. The hydrogen sulphide gas constitutes the combustible material of the reaction and unites with the potassium chlorate, the supporter of combustion, to produce water vapor and sulphur dioxide, which form the main body of motive fluid. The magnesium unites with oxygen of the potassium chlorate and this secondary reaction, due to its high heat of combustion, maintains a sufficiently high temperature at the place of combustion to ensure a continuous reaction of the gaseous hydrogen sulphide and potassium chlorate. Hydrated magnesium sulphate is an inert material, in so far as the reaction is concerned, and serves to effect a slow progression of the place of the combustive reaction from the upper to the lower portion of the tube in which the combustion takes place. The products of combustion are expanded in a suitable motor and are permitted to pass into a condensing chamber suitably formed within the vehicle. In the case of an automobile torpedo, the low temperature of the medium through which it is traveling may be utilized to effect a condensation of the vapor. A part of the condensed vapors are forced by means of a suitable pump from the lower portion of the condensing space and sprayed into the path of the high temperature and high-pressure combustion products for the dual purpose of cooling the high temperature products of combustion to prevent injury to the motor due to excessive heat of the gases, and of increasing the volume of the motive gases by the re-evaporation of the condensed fluid. The chambers in which the combustion occurs are preferably jacketed and means may be employed for conducting some of the condensed vapors to the jacket to be re-evaporated therein and discharged therefrom to mingle with the main mass of motive fluid. Since the compound motive fluid contains only a small portion of non-condensable gases, a small vent for the uncondensed exhausted gases is sufficient. The character of the discharged gases is such that they are largely absorbed by the sea water and hence a torpedo to which this power plant is applied is not accompanied in its operation by the tell-tale wake, common in torpedo manipulation. Moreover, it is possible, by exhausting the air and uncondensed gases from within the torpedo shell, to maintain a low absolute pressure within the torpedo during operation, thus increasing the pressure drop of the motive fluid and lessening the fluid resistance of the rotating motor parts.

Referring to the drawings for a clearer understanding of an embodiment of the invention, reference numeral 10 designates the outer shell of a torpedo. An inner shell 11 is spaced a short distance from the outer shell by suitable spacing means 12 to form a condensing space between the shells. If desired, a plurality of cooling tubes 13 may be arranged between the shells 10 and 11 for the purpose of increasing the condensing capacity of this space. A plurality of cylindrical or other suitably constructed chambers 14 are located in a central compartment of the torpedo and are enclosed within a single jacket or casing 15. A compartment 16 of the torpedo forward of the casing 15 is provided for the storage of the fluid controller of combustion. Extending from the upper portion of the compartment 16 is a conduit 17 which leads downwardly beneath the several chambers 14 and communicates therewith by means of branch connections 18. An off-take manifold 20 for the products of combustion extends above the chambers 14 and communicates with the interior thereof by means of branch connections 21. In order to insure complete combustion of the gases issuing from the chamber 14, a small quantity of the fluid controller of combustion is fed from conduit 17 through a branch pipe 19 into the gases flowing through the manifold 20. Suitable means for controlling the supply of fluid controllers to the chambers 14 may be provided. As shown, in the forward end of the manifold 20 is arranged a reciprocable piston 22 which is sustained against pressure within the manifold by a spring 23. A piston rod 24 secured to the piston 22 is associated with valve 25 in the conduit 17 in such a manner that a rise in pressure within the manifold 20 tends to close the valve 25. A gate valve 26, arranged to be drawn into open position upon the energizing of a solenoid 27, may also be provided in the conduit 17.

The fluid controller of combustion is preferably stored in the compartment 16 in the form of a liquefied gas and under a considerable pressure. The opening of the gate valve 26 relieves the pressure and causes portions of the liquid-gas to evaporate. It is essential in order to secure a ready and continuous evolution of the gas to supply the heat necessary for the evaporation of the liquid gas. This may be effected by leading small quantities of the high-temperature products of combustion from the manifold 20 through a conduit 28, a considerable portion of which is coiled within the chamber 16. The products of combustion after traversing the conduit 28 are discharged into the main stream of motive fluid prior to its introduction into the motor. A valve 29 may be interposed in the conduit 28 and a suitable thermostat 30, immersed in the contents of the chamber 16, may be associated with the valve 29 to regulate the extent of opening of the valve and, consequently, the temperature of the liquid gas.

The motive fluid from the manifold 20 is discharged into a chanmber 31 from where it is delivered through the nozzle 32 to impart energy to a turbine motor 33. The gases from the motor 33 are preferably discharged, as through an opening 34, into the condensing space between the inner and outer shells of the torpedo.

The motor 33 is arranged to rotate a propeller shaft 35 to which are secured propellers, not shown, as is the common practice in this art. A pump 36 is operatively associated with the shaft 35, as through gears 37, and is arranged to pump condensed fluid from the lowermost portion of the condensing space through a pipe 39 and to deliver the condensed fluids under pressure through a pipe 40 to the spray chamber 31. The pipe 40 may extend into the passageway between the manifold 20 and the spray chamber 31 and discharge the condensed fluids in the direction of the path of travel of the high temperature products of combustion, the end of the pipe 40 being preferably provided with a spray nozzle 41. A branch 42 leading from the pipe 40 may also be provided to deliver some of the condensed fluid into the chamber 15. As shown, the pipe 42 extends around and among the chambers 14 and is provided with perforations 43 for spraying the condensed fluid against the heated chambers 14. The walls of the chamber 14 may be of poor conducting material to maintain the ignition temperature of the chamber contents. A pipe 44 leads from the upper portion of the chamber 15 and is arranged to discharge vapors from the chamber 15 into and in the direction of the path of travel of the products of combustion entering the spray chamber 31. That part of the condensed fluid sprayed against the chambers 14 that is not evaporated may be drawn off through pipe 39' to the intake of the pump 36.

The temperature of the motive fluid passing from the spray chamber 31 through the nozzle 32 to the prime mover may be regulated by controlling the amount of condensed vapors delivered to the spray chamber through the spray nozzle 41. Any suitable means for effecting this result may be employed. As shown, a thermostat 45, located in the spray chamber 31 controls the opening of a valve 46 interposed in the pipe 40, the arrangement being such that sufficient quantities of the condensed vapors are sprayed into the chamber 31 to maintain a predetermined temperature of the motive fluid delivered to the prime mover. A relief valve 47 in a by-pass 48 prevents damage to the pump 36 when the valve 46 is partially or wholly closed.

The motive fluid generated, as above described, is, theoretically, completely condensable. Nevertheless, in practice, I find that a small quantity of non-condensable gases collect within the space between the shells, which it is desirable to remove by any suitable form of vent device. I here show a scoop ejector Fig. 5 comprising a hood or scoop 51 so disposed as to catch the water as the torpedo travels through the immersing medium, and to direct it through a delivery nozzle 52 into a combining tube 53 from whence the water and any entrained gases are discharged at 54 without the torpedo. The inner end of the combining tube is formed integrally with the delivery nozzle and is provided with perforations 55 for the admission of non-condensable gases to the ejector. An annular plate 56 is held by a spring 57 against the perforated end of the combining tube to prevent admission of sea water into the torpedo. This is shown, for clearness of illustration, at the top of the torpedo but should preferably be placed lower so as to discharge liquid should an excess accumulate.

Ignition mixtures may be provided for each of the chambers 14 as, for example, cartridges 58 disposed in the upper portions of chambers 14. Suitable means of initiating combustion of the ignition mixtures and for opening valve 27, such as an electric circuit 59, are arranged to become effective upon the operation of the usual trigger 60, in a manner well known in the art.

Having described an arrangement of an apparatus embodying my invention, the operation thereof is as follows: Upon launching the torpedo, the trigger 60 is manipulated to initiate combustion within the ignition cartridges 58 and at the same time open the valve 27 in the pipe 17. The fluid controller of combustion, as for example, hydrogen sulphide, passes in a gaseous state downwardly through the pipe 17 and upwardly through the porous mass of mixed potassium cholorate, hydrated magnesium sulphate and magnesium within the several chambers 14. The mixture in the upper portion of the chambers having been raised to a kindling temperature through the ignition cartridges 58, combustion in the several chambers takes place at the top of the chambers and gradually works downwardly in the chambers during the generation of the motive products of combustion. The products of combustion pass upwardly through the branch connections 21 into the manifold 20 and form therein a motive fluid of high temperature and high pressure. Complete combustion is ensured by the addition of a further quantity of the fluid controller of combustion into the gases issuing from the chambers 14 and prior to their delivery to the motor 33.

The motive fluid is discharged through the motor 33 and is exhausted as through 34 into the condensing space between the inner and outer shells of the torpedo. Being immersed in a cold medium, the vapors are readily condensed in the space between the shells 10 and 11 and are collected in the lower portion of the condensing space. The non-condensable gases are expelled by the ejector 50 and their nature is such that they are largely absorbed in the sea water with the elimination of wake. Upon the starting of the motor 33, the pump 37 is placed in operation and forces the condensed vapors from the lower portion of the condenser through the spray nozzle 41 into the spray chamber 31 in the direction of travel of the products of combustion from the chambers 14 to the motor 33. It may be desirable to place in the bottom of the condenser a small quantity of water so that when the pump 37 is first started, a cooling spray may mix with the first products of combustion from the chambers 14. The combustion within the chambers 14 raises the walls thereof to a high temperature and at the same time leaves clinging to the walls a highly heated solid residue. The heat of the walls and of the residue is made available for the generation of added motive fluid by discharging downwardly about the chambers 14 sprays of condensed vapor. The heat of the tube readily evaporates the liquid which is discharged into the spray chamber 31 to commingle with the motive pressure fluid.

The hydrogen sulphide is confined within the container 16 in liquid form under high pressure. As the pressure is relieved the hydrogen sulphide vaporizes, and is conducted away through pipe 17. Heat sufficient to maintain a ready evaporation of the hydrogen sulphide is supplied by circulating a quantity of the high temperature gases from the manifold 20 through the coil 28 within the container 16, the flow through the coil being regulated by means of the thermostatically controlled valve 29. The pressure of the motive products of combustion within the manifold 20 is maintained during the operation of the torpedo at a substantially uniformly predetermined pressure by regulating the rate of combustion within the several chambers 14. This is effected by controlling the degree of opening of the valve 25, and hence the quantity of the fluid controller of combustion which passes through the pipe 17 to the combustion chambers 14 in response to the pressure within the manifold 20.

The high temperature products of combustion from the chamber 14, the condensed vapors from the nozzle 41 and the re-evaporated condensate from the chamber 15 are delivered into the spray chamber 31 in which a commingling of the fluids, an evaporation of the liquid spray, and a consequent reduction in temperature and increase in volume of the mixed fluids is effected. Proper proportions of the fluid constitutents entering the chamber 31 are attained by regulating the quantity of low temperature fluids admitted to the spray chamber in accordance with the temperature of the resulting mixture, the thermostatic valve 45 serving to control the amount of condensed vapors entering the spray chamber and mixing with the high temperature products of combustion.

While I have shown my invention in but one form, it will be obvious to those skilled in the art that it is not so limited but is susceptible of various other changes and modifications without departing from the spirit thereof and I desire, therefore, that only such limitations shall be placed thereupon as are imposed by the prior art or as are specifically set forth in the appended claims.

What I claim is:

1. In an automobile torpedo, the combination of a closed receptacle charged with a mixture containing a combustible and a supporter of combustion, the mixture being so proportioned as to be in itself incapable of sustaining combustion, a chamber containing a fluid controller of combustion, and means for admitting the fluid controller into the mixture containing a combustible and a combustion supporter.

2. In an automobile torpedo, the combination of a closed receptacle charged with a mixture containing a combustible and a supporter of combustion, the mixture being so proportioned as to be in itself incapable of sustaining combustion, a chamber containing a fluid controller of combustion, means for admitting the fluid controller to the mixture of combustible and combustion supporter, and means responsive to the rapidity of the combustion action for regulating the admission of the fluid controller.

3. In a power-plant for self-propelled devices, the combination of a receptacle charged with a mixture containing a solid combustible and a solid supporter of combustion, the mixture being so proportioned as to be in itself incapable of sustaining combustion, a chamber containing a fluid controller of combustion, means for admitting the fluid controller into the mixture containing a combustible and a combustion supporter, an off-take into which the products of the combustion are discharged from the receptacle, and means for delivering to said off-take limited quantities of the fluid controller to ensure a complete combustion.

4. In a power-plant for self-propelled devices, the combination of a receptacle charged with a mixture containing a solid combustible and a solid supporter of combustion, the mixture being so proportioned as to be in itself incapable of sustaining combustion, a chamber containing a fluid controller of combustion, means for admitting the fluid controller into the mixture containing a combustible and a combustion supporter, an off-take into which the products of combustion are discharged from the receptacle, and a conduit for leading a portion of the products of combustion from the off-take through the said chamber for maintaining a suitable temperature of the fluid controller of combustion.

5. In a power plant for self-propelled devices, the combination of a receptacle charged with a mixture containing a solid combustible and a solid supporter of combustion, the mixture being so proportioned as to be in itself incapable of sustaining combustion, a chamber containing a fluid controller of combustion, means for admitting the fluid controller into the mixture containing a combustible and a combustion supporter, an off-take into which the products of the combustion are discharged from the receptacle, means for delivering to said off-take limited quantities of the fluid controller to ensure a complete combustion, and a conduit for leading a portion of the products of combustion from the off-take through the said chamber for maintaining a suitable temperature of the fluid controller of combustion.

6. In combination in a power plant for self-propelled devices, a vertically disposed receptacle charged with a porous mixture containing a solid combustible and a solid supporter of combustion, the mixture being so proportioned as to be in itself incapable of sustaining combustion, a chamber containing a fluid controller of combustion, a conduit for admitting the fluid controller into the lower portion of the receptacle, an off-take communicating with the upper portion of the receptacle, the arrangement being such that the controller and the products of combustion flow in the same general direction within the receptacle.

7. In combination with a power plant for self-propelled devices, a plurality of elongated receptacles, each charged with a porous mixture containing a solid combustible and a solid supporter of combustion, the mixture being so proportioned as to be in itself incapable of sustaining combustion, a chamber containing a fluid controller of combustion, means for admitting regulated quantities of the fluid controller into one end of each receptacle, and an off-take manifold communicating with the other end of each receptacle for receiving the products of combustion from the receptacle.

8. In combination in a power plant for self-propelled devices, a plurality of elongated receptacles each charged with a porous mixture containing a solid supporter of combustion, the mixture being so proportioned as to be in itself incapable of sustaining combustion, a chamber containing a fluid controller of combustion, means for admitting regulated quantities of the fluid controller into one end of each receptacle, and an off-take manifold communicating with the other end of each receptacle for receiving the products of combustion from the receptacles, a mixing chamber into which the products of combustion are discharged, an expansible fluid motor receiving the products from the mixing chamber, a condenser into which the exhaust from the motor is discharged, and means for delivering under pressure a portion of the condensate from the condenser to said mixing chamber.

9. In combination in a power plant for self-propelled devices, a plurality of elongated receptacles each charged with a porous mixture containing a solid combustible and a solid supporter of combustion, the mixture being so proportioned as to be in itself incapable of sustaining combustion, a casing enclosing the receptacles, a chamber containing a fluid controller of combustion, means for admitting regulated quantities of the fluid controller to one end of each receptacle, an off-take manifold communicating with the other end of each receptacle for receiving the products of combustion from the receptacles, a mixing chamber into which the products of combustion are discharged, an expansible fluid motor receiving the products from the mixing chamber, a condenser into which the exhaust from the motor is discharged, means for delivering under pressure a portion of the condensate from the condenser to the casing, and means for delivering the re-evaporated condensate from the casing to the mixing chamber.

10. In combination in a power plant for self-propelled devices, a plurality of receptacles each charged with a porous mixture containing a solid combustible and a solid supporter of combustion, the mixture being so proportioned as to be in itself incapable of sustaining combustion, a casing enclosing the receptacles, a chamber containing a fluid controller of combustion, means for admitting regulated quantities of the fluid controller into one end of each receptacle, an off-take manifold communicating with the other end of each receptacle for receiving the products of combustion from the receptacles, a mixing chamber into which the products of combustion are discharged, an expansible fluid motor receiving the products from the mixing chamber, a condenser into which the exhaust from the motor is discharged, means for delivering under pressure a portion of the condensate from the condenser to the casing, means for delivering the re-evaporated condensate from the casing to the mixing chamber, and means for delivering under pressure a portion of the condensate from the condenser to said mixing chamber.

11. In an automobile torpedo, the combination of an outer fluid-tight shell for the torpedo, an inner shell spaced from the outer shell and forming a condenser therebetween, means for generating a high-pressure condensable motive fluid, a motor in which the motive fluid is expanded, means to convey the exhausted motive fluid to the condenser, and means to deliver the condensed motive fluid directly into the high-pressure motive fluid for cooling and increasing the volume of the motive fluid.

12. In an automobile torpedo, the combination of a generator, means for generating a high-pressure condensable vapor in said generator, a jacket surrounding said generator, a motor in which the high-pressure vapor is expanded, means for condensing the exhausted vapor, means for conveying at least a portion of the condensed vapor to the jacket, and means for delivering vapor generated in the jacket into the high-pressure vapor from the generator.

13. In an automobile torpedo, the combination of an outer fluid tight shell for the torpedo, an inner shell spaced from the outer shell and forming a condenser therebetween, a generator, means for generating a high-pressure condensable vapor in said generator, a jacket surrounding said generator, a motor in which the high-pressure vapor is expanded, means to convey the expanded vapor to the condenser, means for delivering a portion of the condensed vapor directly into the high-pressure vapor after its discharge from the generator, means for conveying at least a portion of the condensed vapor to the jacket, and means for delivering vapor generated in the jacket into the high-pressure vapor from the generator, whereby the volume of the motive fluid delivered to the motor is increased and the compound vapors are repeatedly passed through the motor.

14. A compound-condensable vapor generated by the chemical combination of a mixture containing a solid combustible and a solid supporter of combustion, the mixture being so proportioned as to be in itself incapable of sustaining a combustion of the mixture, the chemical union being effected by the regulated admission to the mixture of a fluid controller of combustion.

15. In an automobile torpedo, the combination of a closed receptacle charged with a mixture containing a combustible and a supporter of combustion, the mixture being so proportioned as to be in itself incapable of sustaining combustion, a chamber adapted to contain a fluid controller of combustion, and means for admitting the fluid controller from said chamber into said receptacle for producing an exothermic chemical reaction of the combustible, the combustion supporter and the fluid controller of combustion.

16. In an automobile torpedo, the combination of a closed receptacle charged with a mixture containing a combustible and a supporter of combustion, the mixture being so proportioned as to be in itself incapable of sustaining combustion, a chamber adapted to contain a fluid controller of combustion, means for admitting the fluid controller into the said receptacle for producing an exothermic chemical reaction of the combustible, the combustion supporter, and the fluid controller of combustion, and means responsive to the rapidity of the chemical reaction for regulating the rate of admission of the fluid controller.

17. In a power plant for self-propelled devices, the combination of a receptacle charged with a mixture containing a solid combustible and a solid supporter of combustion, the mixture being so proportioned as to be in itself incapable of sustaining combustion, means for heating said mixture to a kindling temperature, a chamber containing a fluid controller of combustion, means for admitting the fluid controller into the receptacle for sustaining combustion, an off-take into which the gaseous products of the combustion are discharged from the receptacle, and means for delivering to said off-take limited quantities of the fluid controller to insure a complete combustion of said gaseous products.

18. In a power plant for self-propelled devices, the combination of a receptacle charged with a mixture containing a solid combustible and a solid supporter of combustion, the mixture being so proportioned as to be in itself incapable of sustaining combustion, means for heating said mixture to a kindling temperature, a chamber containing a fluid controller of combustion, means for admitting the fluid controller into the receptacle for sustaining combustion, an off-take into which the gaseous products of combustion are discharged from the receptacle, and a conduit for leading a portion of the gaseous products of combustion from the off-take through the said chamber for maintaining a suitable temperature of the fluid controller of combustion.

19. In a power plant for self-propelled devices, the combination of a receptacle charged with a mixture containing a solid combustible and a solid supporter of combustion, the mixture being so proportioned as to be in itself incapable of sustaining combustion, means associated with said receptacle for heating the mixture to a kindling temperature, a chamber containing a fluid controller of combustion, means for admitting the fluid controller into the receptacle, an off-take into which the gaseous products of the combustion are discharged from the receptacle, means for delivering to said off-take limited quantities of the fluid controller to insure a complete combustion of the gaseous products, and a conduit for leading a portion of the products of combustion from the off-take through the said chamber for maintaining a suitable temperature of the fluid controller of combustion.

20. In combination in a power plant for self-propelled devices, a receptacle charged with a porous mixture containing a solid combustible and a solid supporter of combustion, the mixture being so proportioned as to be in itself incapable of sustaining combustion, means associated with the receptacle for heating the mixture to a kindling temperature, a chamber containing a fluid controller of combustion, a conduit for admitting the fluid controller into the lower portion of the receptacle, an off-take communicating with the upper portion of the receptacle, the arrangement being such that the fluid controller and the products of combustion flow in the same general direction within the receptacle.

21. In combination in a power plant for self-propelled devices, a receptacle adapted to be charged with a porous mixture containing a solid combustible and a solid supporter of combustion, the mixture being so proportioned as to be in itself incapable of sustaining combustion, a casing enclosing the receptacle, means associated with the receptacle for heating the mixture to a kindling temperature, a chamber containing a fluid controller of combustion, means for admitting regulated quantities of the fluid controller into one end of the receptacle, an off-take manifold communicating with the other end of the receptacle for receiving the gaseous products of combustion from the receptacle, a mixing chamber into which the products of combustion are discharged, an expansible fluid motor receiving the products from the mixing chamber, a condenser into which the exhaust from the motor is discharged, means for delivering under pressure a portion of the condensate from the condenser to the casing, means for delivering the re-evaporated condensate from the casing to the mixing chamber, and means for delivering under pressure a portion of the condensate from the condenser to said mixing chamber.

22. In an automobile torpedo, the combination of a receptacle adapted to be charged with a mixture containing a solid combustible and a solid supporter of combustion, the mixture being so proportioned as to be in itself incapable of supporting combustion, means associated with the receptacle for heating the mixture to a kindling temperature, a chamber adapted to contain a liquefied-gas, means for vaporizing the liquefied gas, and means for delivering a continuous flow of the vaporized gas into the receptacle for sustaining combustion therein.

23. In an automobile torpedo, the combination of a receptacle adapted to be charged with a mixture containing a solid combustible and a solid supporter of combustion, the mixture being so proportioned as to be in itself incapable of supporting combustion, means associated with the receptacle for heating the mixture to a kindling temperature, a chamber adapted to contain a liquefied gas, means for vaporizing the liquefied gas, means for delivering a continuous flow of the vaporized gas into the receptacle for sustaining combustion therein, and means responsive to the pressure of the gaseous products of combustion for controlling the flow of the vaporized gas from the chamber to the receptacle.

24. In an automobile torpedo, the combination of a receptacle to be charged with a mixture containing a solid combustible and a solid supporter of combustion, the mixture being so proportioned as to be in itself incapable of supporting combustion, means associated with the receptacle for heating the mixture to a kindling temperature, a chamber adapted to contain a liquefied gas, means for vaporizing the liquefied gas, means for delivering a continuous flow of the vaporized gas into the receptacle for sustaining combustion therein, said means for vaporizing the liquid-gas comprising a conduit for leading a portion of the products of combustion from the off-take through the said chamber to maintain a suitable vaporizing temperature therein, and means responsive to the temperature of the liquid-gas for controlling the amount of combustion products passing through said conduit.

25. In an automobile torpedo, the combination of a receptacle adapted to be charged with a mixture containing a solid combustible and a solid supporter of combustion, the mixture being so proportioned as to be in itself incapable of supporting combustion, means associated with the receptacle for heating the mixture to a kindling temperature, a chamber adapted to contain a liquefied gas, means for vaporizing the liquefied gas, means for delivering a continuous flow of the vaporized gas into the receptacle for sustaining combustion therein, means responsive to the pressure of the gaseous products of combustion for controlling the flow of the vaporized gas from the chamber to the receptacle, and means for utilizing the energy of the gaseous products of combustion for propelling the torpedo.

26. In an automobile torpedo, the combination of a receptacle adapted to be charged with a mixture containing a solid combustible and a solid supporter of combustion, the mixture being so proportioned as to be in itself incapable of supporting combustion, means associated with the receptacle for heating the mixture to a kindling tmemperature, a chamber adapted to contain a liquefied gas, means for vaporizing the liquefied gas, means for delivering a continuous flow of the vaporized gas into the receptacle for sustaining combustion therein, an off-take into which the gaseous products of combustion are delivered from the receptacle, and means for delivering limited quantities of the vaporized gas to said off-take to ensure a complete combustion of the gaseous products.

27. In an automobile torpedo, the combination of a receptacle adapted to be charged with a mixture containing a solid combustible and a solid supporter of combustion, the mixture being so proportioned as to be in itself incapable of supporting combustion, means associated with the receptacle for heating the mixture to a kindling temperature, a chamber adapted to contain a liquefied gas, means for vaporizing the liquefied gas, means for delivering a continuous flow of the vaporized gas into the receptacle for sustaining combustion therein and an off-take into which the gaseous products of combustion are delivered from the receptacle, said means for vaporizing the liquid gas comprising a conduit for leading a portion of the products of combustion from the off-take through the said chamber to maintain a suitable vaporizing temperature therein.

28. In an automobile torpedo, the combination of a receptacle adapted to be charged with a mixture containing a solid combustible and a solid supporter of combustion, the mixture being so proportioned as to be in itself incapable of supporting combustion, means associated with the receptacle for heating the mixture to a kindling temperature, a chamber adapted to contain a liquefied gas, means for vaporizing the liquefied gas, means for delivering a continuous flow of the vaporized gas into the receptacle for sustaining combustion therein, an off-take into which the gaseous products of combustion are delivered from the receptacle, said means for vaporizing the liquid gas comprising a conduit for leading a portion of the products of combustion from the off-take through the said chamber to maintain a suitable vaporizing temperature therein.

29. In an automobile torpedo, the combination of a receptacle adapted to be charged with a mixture containing a solid combustible and a solid supporter of combustion, the mixture being so proportioned as to be in itself incapable of supporting combustion, means associated with the receptacle for heating the mixture to a kindling temperature, a chamber adapted to contain a liquefied gas, means for vaporizing the liquefied gas, means for delivering a continuous flow of the vaporized gas to the receptacle for sustaining combustion therein, an off-take into which the gaseous products of combustion are delivered from the receptacle, and means for delivering limited quantities of the vaporized gas to said off-take to ensure a complete combustion of the gaseous products, said means for vaporizing the liquid-gas comprising a conduit for leading a portion of the products of combustion from the off-take through the said chamber to maintain a suitable vaporizing temperature therein.

30. In an automobile torpedo, the combination of a receptacle adapted to be charged with a mixture containing a solid combustible and a solid supporter of combustion, the mixture being so proportioned as to be in itself incapable of supporting combustion, means associated with the receptacle for heating the mixture to a kindling temperature, a chamber adapted to contain a liquefied gas, means for vaporizing the liquefied gas, means for delivering a continuous flow of the vaporous gas into the receptacle for sustaining combustion therein, an off-take into which the gaseous products of combustion are delivered from the receptacle, a motor for utilizing the energy of the combustion products for the propulsion of the torpedo, and a condenser into which the exhaust from the motor is discharged.

31. In an automobile torpedo, the combination of a receptacle adapted to be charged with a mixture containing a solid combustible and a solid supporter of combustion, the mixture being so proportioned as to be in itself incapable of supporting combustion, means associated with the receptacle for heating the mixture to a kindling temperature, a chamber adapted to contain liquefied gas, means for vaporizing the liquefied gas, means for delivering a continuous flow of the vaporized gas into the receptacle for sustaining combustion therein, an off-take into which the gaseous products of combustion are delivered from the receptacle, a mixing chamber receiving the combustion products from the off-take, a motor receiving the products from the mixing chamber, a condenser into which the exhaust from the motor is discharged, and means for delivering under pressure a portion of the condensate from the condenser to said mixing chamber.

32. In an automobile torpedo, the combination of a receptacle adapted to be charged with a mixture containing a solid combustible and a solid supporter of combustion, the mixture being so proportioned as to be in itself incapable of supporting combustion, a casing enclosing the receptacle, means associated with the receptacle for heating the mixture to a kindling temperature, a chamber adapted to contain a liquefied gas, means for vaporizing the liquefied gas, means for delivering a continuous flow of the vaporized gas into the receptacle for sustaining combustion therein, an off-take into which the gaseous products of combustion are delivered from the receptacle, a mixing chamber receiving the combustion products from the off-take, a motor receiving the products from the mixing chamber, a condenser into which the exhaust from the motor is discharged, means for delivering under pressure a portion of the condensate from the condenser to the mixing chamber, and another portion of the condensate to the casing, and means for delivering the re-evaporated condensate from the casing to the mixing chamber.

33. In an automobile torpedo, the combination of a receptacle adapted to be charged with a mixture containing a solid combustible and a solid supporter of combustion, the mixture being so proportioned as to be in itself incapable of supporting combustion, a casing enclosing the receptacle, means associated with the receptacle for heating the mixture to a kindling temperature, a chamber adapted to contain a liquefied gas, means for vaporizing the liquefied gas, means for delivering a continuous flow of the vaporized gas into the receptacle for sustaining combustion therein, an off-take into which the gaseous products of combustion are delivered from the receptacle, a mixing chamber receiving the combustion products from the off-take, a motor receiving the products from the mixing chamber, a condenser into which the exhaust from the motor is discharged, means for delivering under pressure a portion of the condensate from the condenser to the mixing chamber, and another portion of the condensate to the casing, means for delivering the re-evaporated condensate from the casing to the mixing chamber, and means responsive to the temperature of the mixed fluids in the mixing chamber for controlling the amount of condensate delivered thereto.

34. In an automobile torpedo in which the interior of the torpedo is to be maintained in operation at a lower pressure than the surrounding water, the combination with the torpedo shell of a scoop ejector having means for utilizing the motion of the torpedo for causing a portion of the surrounding water to pass through the ejector so as to entrain and to discharge at least a portion of the fluid contents of the torpedo.

35. In an automobile torpedo in which the interior of the torpedo is to be maintained in operation at a lower pressure than the surrounding water, the combination with the torpedo shell of an ejector arranged to entrain and discharge at least a portion of the fluid contents of the torpedo, a scoop extending outward from the shell to catch a portion of the surrounding water and direct the same into the ejector, means associated with the ejector for preventing the surrounding water from entering the interior of the torpedo.

36. In a pressure generator, a combustion chamber, a solid mixture therein containing a substance from which oxygen is readily liberated, means for delivering to the combustion chamber a gaseous combustible, and means for supplying initial heat for promoting the chemical reaction in the combustion chamber.

37. In a pressure generator, a combustion chamber, a solid mixture therein containing a combustible and a substance from which oxygen is readily liberated, a chamber containing a combustible in the form of a liquefied gas, means for vaporizing the liquefied gas, means for delivering the vaporized gas to the combustion chamber, and means for supplying initial heat for promoting the chemical reaction in the combustion chamber.

38. In the art of propelling an automobile torpedo, in which an expansible pressure fluid is generated by the combustion of a mixture containing a solid combustible and a solid supporter of combustion, the mixture being so proportioned as to be in itself incapable of sustaining combustion, the combustion being effected and controlled by continuously adding to the mixture a gaseous fluid evolved from a liquid-gas stored under pressure, the method which comprises heating the mixture to a kindling temperature, vaporizing the liquid gas, and bringing the vaporized gas into contact with the mixture to effect combustion and a consequent generation of high-pressure gaseous products of combustion.

39. In the art of propelling an automobile torpedo, in which an expansible pressure fluid is generated by the combustion of a mixture containing a solid combustible and a solid supporter of combustion, the mixture being so proportioned as to be in itself incapable of sustaining combustion, the combustion being effected and controlled by continuously adding to the mixture a gaseous fluid evolved from a liquid-gas stored under pressure, the method which comprises heating the mixture to a kindling temperature, vaporizing the liquid-gas, bringing the vaporized gas into contact with the mixture to effect combustion and a consequent generation of high-pressure gaseous products of combustion, and controlling the rate at which the vaporized gas is brought into contact with the mixture in response to the rapidity of the combustion action.

40. In the art of propelling an automobile torpedo in which an expansible pressure fluid is generated by the combustion of a mixture containing a solid combustible and a solid supporter of combustion, the mixture being so proportioned as to be in itself incapable of sustaining combustion, the combustion being effected and controlled by continuously adding to the mixture a gaseous fluid evolved from a liquid-gas stored under pressure, the method which comprises heating the mixture to a kindling temperature, vaporizing the liquid-gas, bringing the vaporized gas into contact with the mixture to effect combustion and a consequent generation of high-pressure gaseous products of combustion, and controlling the rate at which the vaporized gas is brought into contact with the mixture in response to the pressure of the gaseous products of combustion.

41. In the art of propelling an automobile torpedo in which an expansible pressure fluid is generated by the combustion of a mixture containing a solid combustible and a solid supporter of combustion, the mixture being so proportioned as to be in itself incapable of sustaining combustion, the combustion being effected and controlled by continuously adding to the mixture a gaseous fluid evolved from a liquid-gas stored under pressure, the method which comprises heating the mixture to a kindling temperature, vaporizing the liquid-gas by relieving the pressure thereon, heating the liquid-gas to maintain a predetermined temperature of the liquid-gas and a corresponding pressure of the gases evolved therefrom, and bringing the vaporized gas into contact with the mixture to effect combustion and a consequent generation of high-pressure gaseous products of combustion.

42. In the art of propelling an automobile torpedo in which an expansible pressure fluid is generated by the combustion of a mixture containing a solid combustible and a solid supporter of combustion, the mixture being so proportioned as to be in itself incapable of sustaining combustion, the combustion being effected and controlled by continuously adding to the mixture a gaseous fluid evolved from a liquid-gas stored under pressure, the method which comprises heating the mixture to a kindling temperature, vaporizing the liquid-gas by relieving the pressure thereon, bringing the vaporized gas into contact with the mixture to effect combustion and a consequent generation of high-pressure gaseous products of combustion, and conveying regulated quantities of the gaseous products of combustion into heat-exchanging relation to the liquid-gas to maintain a predetermined temperature thereof and a corresponding pressure of the gases evolved therefrom.

43. In the art of propelling an automobile torpedo in which an expansible pressure fluid is generated by the combustion of a mixture containing a solid combustible and a solid supporter of combustion, the mixture being so proportioned as to be in itself incapable of sustaining combustion, the combustion being effected and controlled by continuously adding to the mixture a gaseous fluid evolved from a liquid-gas stored under pressure, the method which comprises heating the mixture to a kindling temperature, vaporizing the liquid gas by relieving the pressure thereon, bringing the vaporized gas into contact with the mixture to effect combustion and a consequent generation of high-pressure gaseous products of combustion, and delivering in addition limited quantities of the vaporized gas to the gaseous products to ensure a complete combustion of the gaseous products.

44. In the art of propelling an automobile torpedo in which an expansible pressure fluid is generated by the combustion of a mixture containing potassium chlorate, hydrated magnesium sulphate and magnesium in substantially the following proportions: potassium chlorate, 128 parts; hydrated magnesium sulphate, 20 parts; magnesium 2 parts; the combustion being effected and controlled by continuously adding to the mixture a suitable gaseous fluid evolved from a liquid-gas stored under pressure, the method which comprises heating the mixture to a kindling temperature, vaporizing the liquid-gas and bringing the vaporized gas into contact with the mixture to effect combustion and a consequent generation of high-pressure gaseous products of combustion.

45. In the art of propelling an automobile torpedo in which an expansible pressure fluid is generated by the combustion of a mixture containing potassium chlorate, hydrated magnesium sulphate and magnesium, the mixture being so proportioned as to be in itself incapable of sustaining combustion, the combustion being effected and controlled by continuously adding to the mixture a suitable gaseous fluid evolved from a liquid-gas stored under pressure, the method which comprises heating the mixture to a kindling temperature, vaporizing the liquid-gas, and bringing the vaporized gas into contact with the mixture to effect combustion and a consequent generation of high-pressure gaseous products of combustion.

46. In the art of propelling an automobile torpedo in which an expansible pressure fluid is generated by the combustion of a mixture containing potassium chlorate, hydrated magnesium sulphate and magnesium, the mixture being so proportioned as to be in itself incapable of sustaining combustion, the combustion being effected and controlled by continuously adding to the mixture hydrogen sulphide gas evolved from liquefied hydrogen sulphide stored under pressure, the method which comprises heating the mixture to a kindling temperature, vaporizing the liquefied hydrogen sulphide, bringing the vaporized hydrogen sulphide into contact with the mixture to effect combustion and a consequent generation of high-pressure gaseous products of combustion.

47. In the art of generating a motive fluid for automobile torpedoes and the like, the method which consists in subjecting a mixture containing a combustible and a supporter of combustion, the mixture being so proportioned as to be in itself incapable to sustain a combustion of the mixture, to a kindling temperature; adding a fluid controller of combustion to the mixture to effect combustion; and withdrawing the gaseous products of combustion for use in a motor.

48. In the art of generating a motive fluid for automobile torpedoes and the like, the method which consists in subjecting a mixture containing a combustible and a supporter of combustion, the mixture being so proportioned as to be incapable in itself to sustain a combustion of the mixture, to a kindling temperature; adding a fluid combustion controller to the mixture to effect combustion; regulating the quantity of fluid controller added; and withdrawing the gaseous products of combustion for use in a motor.

49. In the art of propelling automobile torpedoes and the like, the method which consists in subjecting a mixture containing a combustible and a supporter of combustion, the mixture being so proportioned as to be incapable in itself to sustain a combustion of the mixture, to a kindling temperature; adding a fluid combustion controller to the mixture to effect combustion; expanding the gaseous combustion products in a motor; and condensing the products exhausted from the motor.

50. In the art of propelling automobile torpedoes and the like, the method which consists in subjecting a mixture containing a combustible and a supporter of combustion, the mixture being so proportioned as to be incapable in itself to sustain a combustion of the mixture, to a kindling temperature; adding a fluid combustion controller to the mixture to effect combustion; expanding the gaseous combustion products in a motor; condensing the products exhausted from the motor; and returning at least a part of the condensed products to the gaseous combustion products prior to the delivery of the latter to the motor.

51. In the art of generating a motive fluid for automobile torpedoes and the like, the method which consists in adding regulated quantities of a fluid controller of combustion to a mixture of potassium chlorate, hydrated magnesium sulphate and magnesium, in substantially the following proportions: potassium chlorate, 128 parts; hydrated magnesium sulphate, 20 parts; and magnesium, 2 parts; and withdrawing the gaseous products of combustion for use in a motor.

52. In the art of generating a motor fluid for automobile torpedoes and the like, the method which consists in adding regulated quantities of hydrogen sulphide to a mixture of potassium chlorate, hydrated magnesium sulphate and magnesium, in substantially the following proportions: potassium chlorate, 128 parts; hydrated magnesium sulphate, 20 parts; and magnesium 2 parts; and withdrawing the gaseous products of combustion for use in a motor.

53. The method of propelling torpedoes comprising the exothermic generation of a gaseous pressure fluid which is condensable or absorbable in water; abstracting energy from the pressure fluid by a suitable propulsion prime mover; condensing the major portion of the fluid exhausted from the prime mover; conducting at least a portion of the condensate to the region of exothermic gas generation where it is re-vaporized and heat energy absorbed for subsequent use in the prime mover; and leading the uncondensed portions of the exhausted fluid to the sea; whereby the exhausted pressure fluid is either condensed within the torpedo or absorbed in the sea water.

54. The method of generating a pressure fluid which consists in chemically uniting a combustible gas and a solid material from which oxygen is readily liberated, and in employing heat for initiating the reaction.

55. The method of generating a pressure fluid which consists in chemically uniting a combustible gas and a solid substance containing a large proportion of oxygen, and in employing heat for initiating the reaction.

56. The method of generating a pressure fluid which consists in chemically uniting a combustible gas and an oxygen bearing solid, and in employing heat for initiating the reaction.

57. The method of generating a pressure fluid which consists in effecting a chemical reaction between a combustible gas, a combustible solid and an oxygen bearing solid, and in employing heat for initiating the reaction.

58. The method of generating a pressure fluid which consists in effecting a chemical reaction between a combustible gas, a combustible solid and a solid from which oxygen is readily liberated, and in employing heat for initiating combustion.

In testimony whereof, I have hereunto subscribed my name this 20th day of June, 1921.

ALEXANDER T. KASLEY.